(12) United States Patent
Barnes et al.

(10) Patent No.: US 9,986,177 B2
(45) Date of Patent: May 29, 2018

(54) SPECTRAL ENHANCEMENTS TO MOBILE DEVICES

(71) Applicant: GALILEO GROUP INC., Melbourne, FL (US)

(72) Inventors: Donald Michael Barnes, Melbourne, FL (US); James Michael Grichnik, Miami Beach, FL (US); Zhihong Pan, Durham, NC (US)

(73) Assignee: GALILEO GROUP, INC., Melbourne, FL (US)

( * ) Notice: Subject to any disclaimer, the term of this patent is extended or adjusted under 35 U.S.C. 154(b) by 0 days. days.

(21) Appl. No.: 15/455,020

(22) Filed: Mar. 9, 2017

(65) Prior Publication Data
US 2017/0264833 A1    Sep. 14, 2017

Related U.S. Application Data

(60) Provisional application No. 62/305,966, filed on Mar. 9, 2016.

(51) Int. Cl.
| | |
|---|---|
| *H04N 5/232* | (2006.01) |
| *H04N 5/33* | (2006.01) |
| *H04N 5/225* | (2006.01) |
| *H04N 7/18* | (2006.01) |
| *G03B 15/04* | (2006.01) |
| *B64C 39/02* | (2006.01) |
| *B64D 47/08* | (2006.01) |
| *G06F 17/30* | (2006.01) |
| *H04M 1/725* | (2006.01) |
| *G02B 26/00* | (2006.01) |

(52) U.S. Cl.
CPC .......... *H04N 5/332* (2013.01); *B64C 39/024* (2013.01); *B64D 47/08* (2013.01); *G03B 15/041* (2013.01); *G03B 15/0405* (2013.01); *G06F 17/3025* (2013.01); *H04M 1/72522* (2013.01); *H04N 5/2256* (2013.01); *H04N 5/2257* (2013.01); *H04N 5/23232* (2013.01); *H04N 7/181* (2013.01); *B64C 2201/123* (2013.01); *B64C 2201/127* (2013.01); *G02B 26/008* (2013.01); *H04M 2250/52* (2013.01)

(58) Field of Classification Search
CPC ...................................................... H04N 5/332
USPC ...................................................... 348/207.1
See application file for complete search history.

(56) References Cited

U.S. PATENT DOCUMENTS

2009/0318815 A1* 12/2009 Barnes ................. A61B 5/0062
                                                                    600/473

* cited by examiner

*Primary Examiner* — Joel Fosselman
(74) *Attorney, Agent, or Firm* — Morgan, Lewis & Bockius LLP

(57) ABSTRACT

A method for capturing and consolidating multi-spectral image data for regions of interest using one or more spectral boost mechanisms or techniques is disclosed. A first multi-spectral or hyperspectral workflow comprising time-stamped two-dimensional pixelated images of a region of interest is obtained by a first computer-enabled imaging device. Each of the images corresponds to image data captured for a respective frequency band of a plurality of frequency bands. First meta data is associated with the images of the first workflow and includes: a plurality of first positions and first orientations of the first imaging device indicating first positional and orientation data for the first imaging device, and indications of a respective frequency band for each of the images of the first workflow. A consolidated multi-spectral workflow for the region of interest is generated, which includes spectrally and spatially consolidating the images of the first workflow using the first meta data.

22 Claims, 8 Drawing Sheets

SPECTRAL ENHANCEMENTS TO MOBILE DEVICES

CROSS REFERENCE TO RELATED PATENT APPLICATIONS

This application claims priority to U.S. Provisional Patent Application No. 62/305,966, entitled "Spectral Enhancements to Mobile Devices," filed Mar. 9, 2016, which is hereby incorporated by reference.

TECHNICAL FIELD

The present disclosure relates generally to image processing and informatics, including but not limited to capturing and consolidating multi-spectral image data for regions of interest using one or more spectral boost mechanisms or techniques.

BACKGROUND

The use of imaging technology for analyzing surface structures has a number of broad biomedical and non-biological applications, ranging from medical imaging and disease detection, to verifying the integrity of building structures. Despite significant advances in the processing and imaging capabilities of consumer devices, imaging technology and equipment enabling this surface imaging and analysis functionality has traditionally been prohibitively costly and impractical for adoption by the broad consumer demographic. The ability to effectively capture and consolidate varied spectral image data of a target using these existing imaging systems has not been developed. Furthermore, mechanisms for aggregating subject data on a large scale for enhanced surface informatics based detection also remain substantially undeveloped.

SUMMARY

Accordingly, there is a need for faster, more efficient methods, systems, devices, and interfaces for capturing and consolidating multi-spectral image data. By employing various device configurations and mechanisms for spectral manipulation, spectral image data for a plurality of different frequency bands can be captured and associated with various meta data. The collection of captured data may then be consolidated into a multi-spectral workflow for further processing, analysis, or display. Such methods and interfaces optionally complement or replace conventional methods for capturing and consolidating image data using sensor devices.

In accordance with some embodiments, a method for capturing multispectral and hyperspectral data for regions of interest using one or more spectral boost mechanisms or techniques is performed at a first computer-enabled imaging device (e.g., a first client device/sensor device, such as a smart phone). The first computer-enabled imaging device has one or more first processors, a first two-dimensional pixelated detector, and first memory for storing one or more programs for execution by the one or more first processors. A first multi-spectral workflow comprising time-stamped two-dimensional pixelated images of a region of interest is obtained. Each of the images of the first workflow corresponds to image data captured for a respective frequency band of a plurality of frequency bands of light. First meta data is associated with the images of the first workflow, wherein the first meta data includes: (i) a plurality of first positions and a plurality of first orientations of the first imaging device indicating first positional and orientation data for the first imaging device during the obtaining of the first workflow, and (ii) indications of a respective frequency band for each of the images of the first workflow. At a central system and/or the first imaging device, a consolidated multi-spectral workflow for the region of interest is generated, which includes spectrally and spatially consolidating the images of the first workflow using the first meta data.

In accordance with some embodiments, a computer-enabled imaging device includes a processor and memory for storing one or more programs for execution by the processor, the one or more programs including instructions for performing any of the operations described above.

In accordance with some embodiments, a central system includes a processor and memory for storing one or more programs for execution by the processor, the one or more programs including instructions for performing any of the operations described above.

In accordance with some embodiments, a computer-readable storage medium storing one or more programs for execution by one or more processors, the one or more programs including instructions for performing any of the operations described above.

Thus, computer-enabled imaging devices are provided with faster, more efficient methods for capturing and consolidating multi-spectral image data, thereby increasing the value, effectiveness, efficiency, and user satisfaction with such devices.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first smart phone could be termed a second smart phone, and, similarly, a second smart phone could be termed a first smart phone, without departing from the scope of the various described embodiments. The first smart phone and the second smart phone are both smart phones, but they are not the same smart phone.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
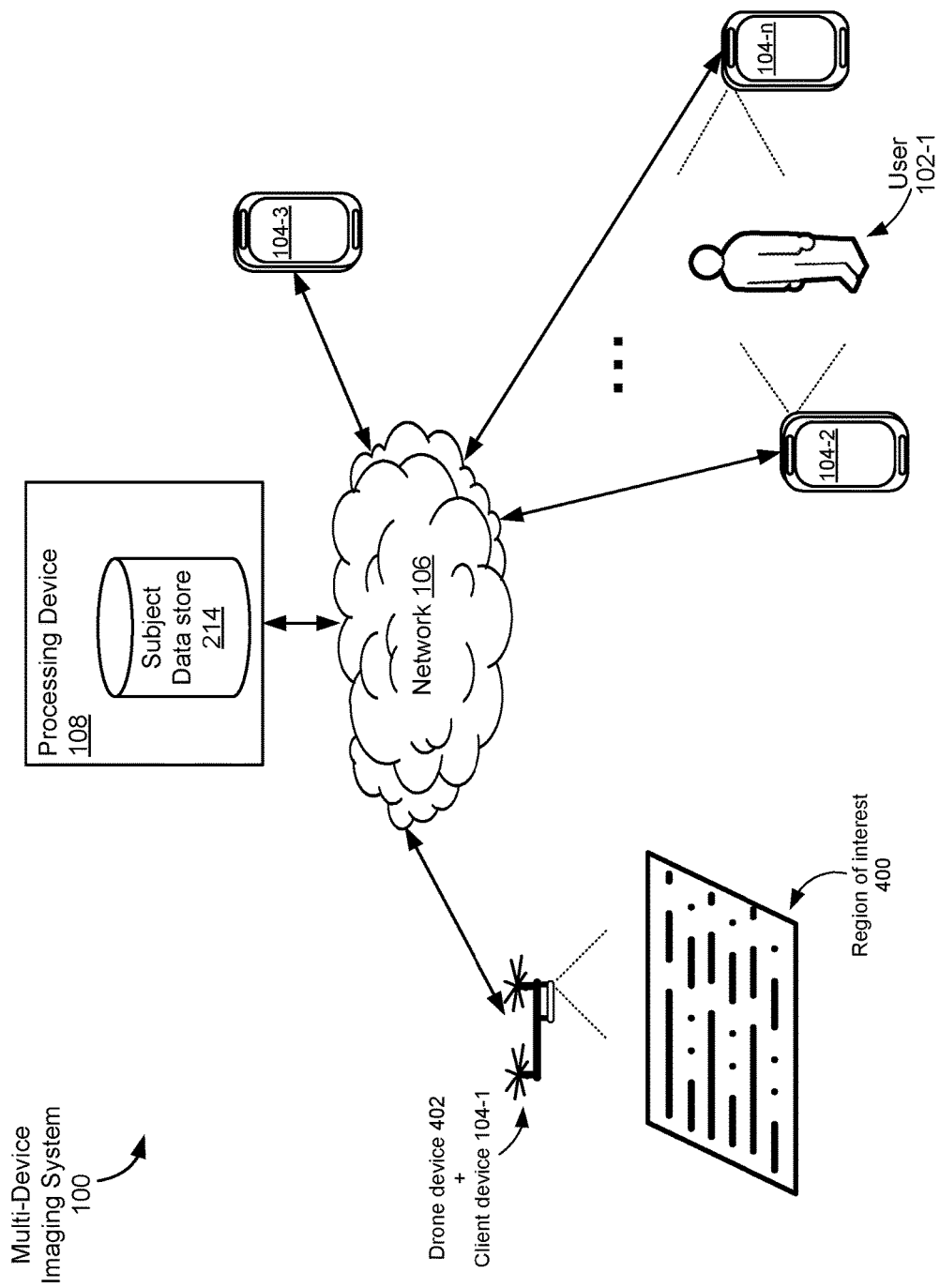
FIG. 1 is a block diagram illustrating an exemplary multi-device imaging system, in accordance with some embodiments.

FIG. 1 is a block diagram illustrating a multi-device imaging system 100, in accordance with some embodiments. The imaging system 100 includes a number of client devices (also called "computer-enabled imaging devices," "client systems," "client computers," or "clients") 104-1, 104-2, 104-3 . . . 104-n and a processing device 108 (also called a central system) communicably connected to one another by one or more networks 106 (e.g., the Internet, cellular telephone networks, mobile data networks, other wide area networks, local area networks, metropolitan area networks, and so on).

In some embodiments, the one or more networks 106 include a public communication network (e.g., the Internet and/or a cellular data network), a private communications network (e.g., a private LAN or leased lines), or a combination of such communication networks. In some embodiments, the one or more networks 106 use the HyperText Transport Protocol (HTTP) and the Transmission Control Protocol/Internet Protocol (TCP/IP) to transmit information between devices or systems. HTTP permits client devices to access various resources available via the one or more networks 106. In some embodiments, the one or more networks 106 are wireless communications channels based on various custom or standard wireless communications protocols (e.g., IEEE 802.15.4, Wi-Fi, ZigBee, 6LoWPAN, Thread, Z-Wave, Bluetooth Smart, ISA100.11a, WirelessHART, MiWi, etc.), or any other suitable communication protocol, including communication protocols not yet developed as of the filing date of this document. Alternatively, in some embodiments, at least a portion of the one or more networks 106 comprise physical interfaces based on wired communications protocols (e.g., Ethernet, USB, etc.). Although all devices are illustrated as being interconnected through the network 106, in some implementations, any of the aforementioned devices or systems are communicably connected with each other either directly (i.e., device-to-device) or through a network device (e.g., a router represented by network 106), or with only a subset of the other devices of the imaging system 100, via any combination of the aforementioned networks 106 (e.g., client devices 104 communicate with one another via Bluetooth, transmit time-stamped images to the processing device 108 via a cellular network, and receive control signals from a control device via Wi-Fi). The various embodiments of the invention, however, are not limited to the use of any particular communication protocol.

In some embodiments, the client devices 104-1, 104-2, . . . 104-n are computing devices such as cameras, video recording devices, smart watches, personal digital assistants, portable media players, smart phones, tablet computers, 2D devices, 3D (e.g., virtual reality) devices, laptop computers, desktop computers, televisions with one or more processors embedded therein or coupled thereto, in-vehicle information systems (e.g., an in-car computer system that provides navigation, entertainment, and/or other information), and/or other appropriate computing devices that can be used to capture various types of data (e.g., multimedia, such as image, video, and/or audio data; meta data; etc.), as well as communicate with other client devices 104 and/or the processing device 108.

Client device 104 may be used to capture data in a handheld manner (e.g., a user holding and/or moving a client device 104 by hand for capturing image data and meta data). In some embodiments, client devices are configured to be mounted on or attached to various apparatuses/platforms which affect and dictate a motion of the client device during data capture. Client devices may, for example, be fixed to structures (e.g., walls, ceilings), attached to vehicles (e.g., bikes, automobiles, planes, drones 402, etc.), and/or attached to humans/animals (e.g., via clothing, helmets, collars) to record subjects or activities in a multidimensional manner (e.g., spatially and temporally). In some embodiments, mobile apparatuses to which client devices are mounted include one or more processors and memory storing instructions (e.g., received control signals, pre-programmed flight patterns, flight instructions, etc.) for execution by the one or more processors. In some embodiments, mobile apparatuses include at least some of the same operational capabilities and features of the client devices 104, which may be used additionally, alternatively, and/or in conjunction with the client devices 104 (e.g., drone devices include additional sensors that may be used in conjunction with sensors of the client devices 104). In some embodiments, the first client device is fixedly mounted to the mobile apparatus (e.g., drone) such that sensor readings by the first client device are substantially representative of environmental conditions associated with the mobile apparatus. For example, sensor readings obtained by the first client device that indicate an orientation of the first client device, also indicate an orientation of a mobile apparatus to which the first client device is mounted. In other words, in some embodiments, because the first client device and the mobile apparatus are fixedly mounted, their respective orientations are substantially the same. Similarly, as another example, a location of the first client device (derived from sensor readings acquired by the first client device) is substantially the same as a location of the mobile apparatus.

Client devices 104 (which may be mounted to respective mobile apparatuses) may be deployed to obtain or generate data for a designated subject (e.g., human subject, such as user 102-1) or a region of interest (e.g., crop fields, urban landscapes, etc., such as region of interest 400) for later processing and analysis (e.g., transmitting captured data to a processing device 108 and/or other client devices for processing). By employing a variety of techniques and methods (described in greater detail throughout), client devices 104 may be configured to capture a multi-spectral (and optionally, hyperspectral) workflow that includes image data for one or a plurality of frequency bands of light (e.g., image data for a specified frequency band or wavelength, such as specified frequency bands of the visible light spectrum, ultraviolet spectrum, etc.). Client devices 104 may also be configured to receive, display, and/or manipulate data (e.g., data generated, obtained, or produced on the device itself, consolidated workflows received from the processing device 108 or other client devices, etc.). In some embodiments, the client devices 104 (and/or respective mobile apparatuses) capture multimedia data (e.g., time-stamped images, video, audio, etc.), and associate respective meta data (e.g., environmental information (time, geographic location), device readings (sensor readings from accelerometers, gyroscopes, barometers), etc.) with the captured multimedia data. After the captured data is processed (e.g., by a processing device 108, client devices 104, etc.), the same or other client devices 104 may subsequently receive data from the processing device 108 and/or other client devices for display (e.g., temporally, spectrally, and/or spatially consolidated workflows, including two or three-dimensional maps, point clouds, textured maps, etc.).

As described in greater detail with respect to FIGS. 4A-4B and FIGS. 5A-5C, client devices 104 (e.g., one or a plurality) may be configured to capture multi-spectral (and sometimes hyperspectral) workflows that include image data corresponding to specified frequency bands electromagnetic radiation. FIG. 1 illustrates different examples, one in which data (e.g., spectral image data, meta data, etc.) for a region of interest 400 (e.g., a crop field) is captured by a client device 104-1 coupled to a drone drive 402, and another in which data for a user 102-1 (e.g., a human subject) is captured by client devices 104-2 and 104-n. In some implementations, captured image data may be virtually resampled (described in greater detail with respect to FIGS. 5A-5C) to obtain such multi-spectral workflows. Additionally and/or alternatively, multi-spectral workflows may be obtained by configuring one or more client devices (e.g., using optical filters, lenses, and/or other physical mechanisms for manipulating spectral characteristics of incident light) to capture image data for a specified frequency band(s). Any of these techniques may further be applied in combination with single or multiple device configurations, which may optionally be combined with one or multiple mobile apparatuses.

In some embodiments, client devices 104 also serve as control devices for synchronizing operational processes with those of one or more other devices. For instance, in some embodiments, one or more client devices 104 are used to dynamically generate control signals for transmission to other devices (e.g., client devices 104, respective mobile apparatuses, etc.) for synchronized data capture (e.g., synchronous image/meta data capture with respect to temporal, spatial, or spectral parameters). Control signals include instructions executable by a receiving device (e.g., client device 104, mobile apparatus) that modify parameters of a mobile pattern (e.g., a flight line/positioning of a drone) or capture parameters (e.g., increased image resolution, data capture start/end time, etc.).

The processing device 108 (which, in some embodiments, may itself be a client device 104) stores, processes, consolidates (spatially, temporally, and/or spectrally), and/or analyzes data received from one or more devices (e.g., datasets of a subject received from client devices 104, which include multimedia data, associated meta data, etc.). The resulting data of such processing and analysis are in turn disseminated to the same and/or other devices for viewing, manipulation, and/or further processing and analysis. In some embodiments, the processing device 108 consolidates data received from one or more client devices 104 and performs one or more geomatics based processes. For example, using associated meta data, the processing device 108 constructs two or three-dimensional maps (e.g., by matching features identified across workflows, estimating parallax between images, and adding points to a map when a parallax threshold is satisfied), where the constructed maps are used to create dense point clouds and/or generate textured meshes representing a subject. In some embodiments, useful biological or non-biological data is further derived and extracted from visual representations generated by geomatics based processes (e.g., extracting data from the spatial, spectral, and/or temporal representations of subject datasets, such as generated maps, point clouds, and/or meshes). Extracted data can be further processed or analyzed for detection purposes (e.g., detecting a temporally observable change or pre-confirmed condition). In some embodiments, the processing device 108 is a single computing device such as a computer server, while in other embodiments, the processing device 108 is implemented by multiple computing devices working together to perform the actions of a server system (e.g., cloud computing).

In some embodiments, data (e.g., a consolidated workflow) is sent to and viewed by the client devices in a variety of output formats, and/or for further processing or manipulation (e.g., CAD programs, 3D printing, virtual reality displays, holography applications, etc.). In some embodiments, data is sent for display to the same client device that performs the image capture and acquires sensor readings (e.g., client devices 104), and/or other systems and devices (e.g., data apparatus 108, a client device 104-3 that is a dedicated viewing terminal, etc.). In some embodiments, client devices 104 access data and/or services provided by the processing device 108 by execution of various applications. As another example, one or more of the client devices 104-1, 104-2, . . . 104-n execute software applications that are specific to viewing and manipulating data (e.g., surface informatics "apps" running on smart phones or tablets).

Figure 2:
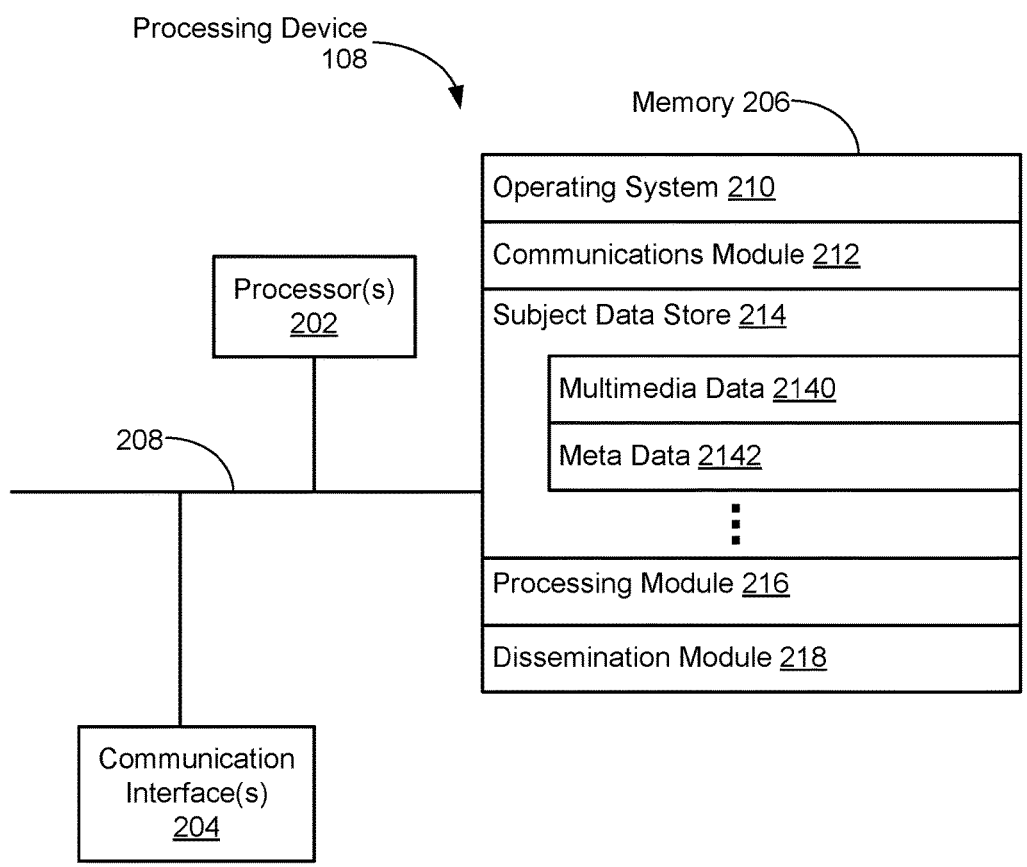
FIG. 2 is a block diagram illustrating an exemplary processing device, in accordance with some embodiments.

FIG. 2 is a block diagram illustrating an exemplary processing device 108, in accordance with some embodiments. In some embodiments, the processing device 108 is a central system, client device (e.g., one or more client devices 104, FIG. 1), processing device apparatus, server system, or any other electronic device for receiving, collecting, storing, consolidating, displaying, and/or processing data received from a plurality of devices over a network (sometimes referred to alternatively as a data processing and display system).

The processing device 108 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The processing device 108 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Figure 3:
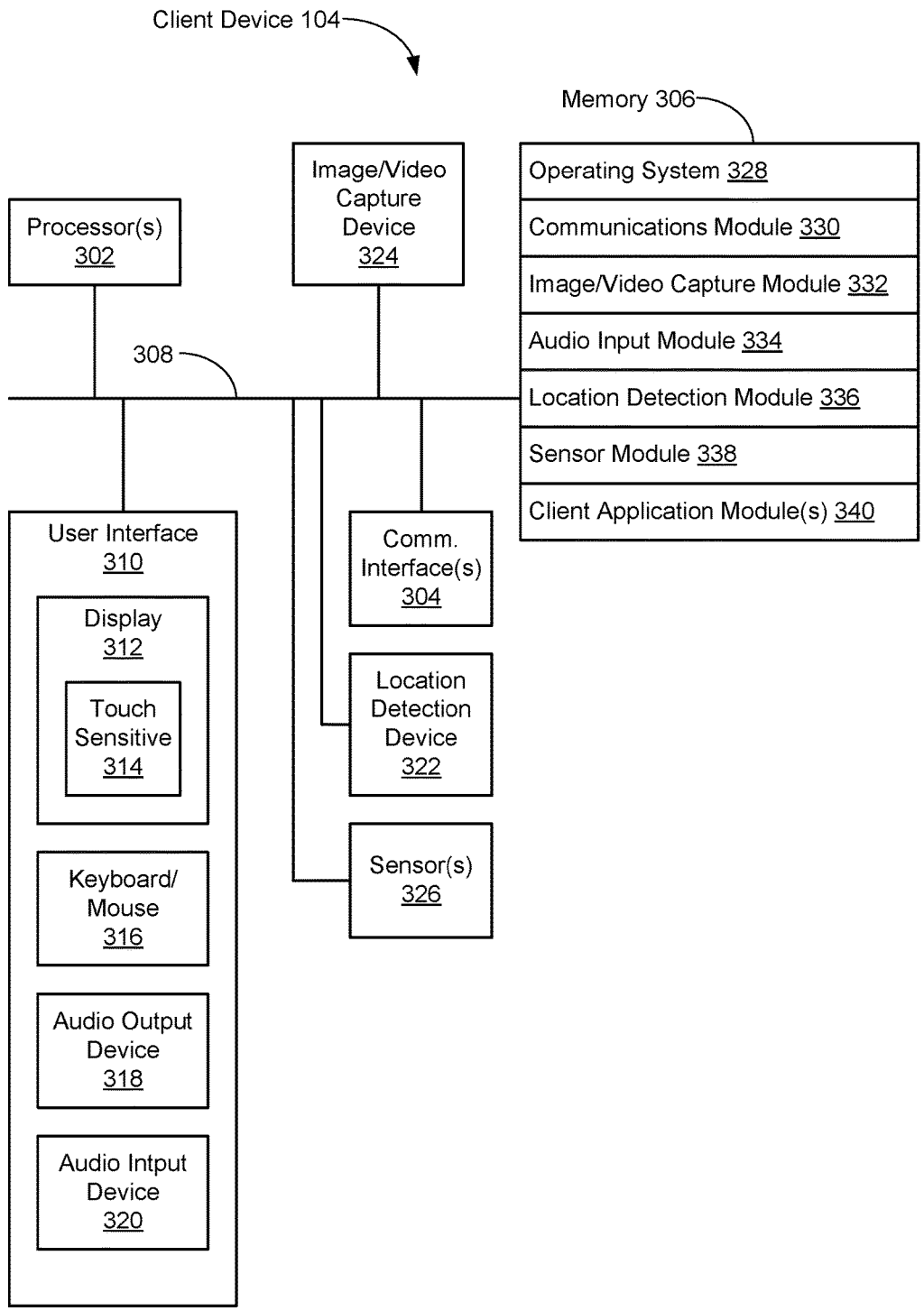
FIG. 3 is a block diagram illustrating an exemplary client device, in accordance with some embodiments.

Memory 206 includes high-speed random-access memory, such as DRAM, SRAM, DDR RAM, or other random-access solid-state memory devices; and may include non-volatile memory, such as one or more magnetic disk storage devices, optical disk storage devices, flash memory devices, and/or other non-volatile solid-state storage devices. Memory 206 optionally includes one or more storage devices remotely located from the processor(s) 202. Memory 206, or alternately the non-volatile memory device(s) within memory 206, includes a non-transitory computer-readable storage medium. In some embodiments, memory 206 or the computer-readable storage medium of memory 206 stores the following programs, modules and data structures, or a subset or superset thereof:

- an operating system 210 that includes procedures for handling various basic system services and for performing hardware dependent tasks;
- a network communication module 212 that is used for connecting the processing device 108 to other computers, systems, and/or client devices 104 via the one or more communication network interfaces 204 (wired or wireless) and one or more communication networks (e.g., the one or more networks 106)
- a subject data store 214 for storing captured data associated with subjects or specific regions of interest thereof, (e.g., captured by one or more client devices 104, FIGS. 1 and 3), such as:
  - multimedia data 2140 for storing multimedia data (e.g., time-stamped images, video, audio, etc.) captured by one or more sensors or devices (e.g., two-dimensional pixelated detector and/or microphone of a client device 104, FIG. 3) of the client devices 104 (and/or mobile apparatuses); and
  - meta data 2142 for storing meta data (e.g., device data, environmental device measurements, and/or other data associated with captured multimedia) acquired by a client device 104 (and/or respective mobile apparatuses), including but not limited to: device identifiers (e.g., identifying the device of a group of devices that captured the multimedia item, which may include an arbitrary identifier, a MAC address, a device serial number, etc.), temporal data (e.g., date and time of a corresponding capture), location data (e.g., GPS coordinates of the location at which multimedia item was captured), multimedia capture/device settings (e.g., image resolution, focal length, frequency at which images are captured, frequency ranges that a pixelated detector is configured to detect, etc.), sensor frequencies (e.g., the respective frequency at which sensors of a device captured data, such as an accelerometer frequency, a gyroscope frequency, a barometer frequency, etc.), accelerometer readings (e.g., in meters/sec2), positional data (e.g., (x, y, z) coordinates of the device with respect to a pre-defined axes or point of reference; distances between stacked client devices; etc.), orientation data (e.g., roll ($\varphi$), pitch ($\theta$), yaw ($\psi$)), frequency band information (e.g., respective frequency bands of light for captured images of a workflow), and/or any additional sensor or device measurements or readings for determining spatial, spectral, and/or temporal characteristics of a device, region of interest, or imaged subjects/surfaces;
- processing module 216 for processing, manipulating, and analyzing received data (e.g., from one or more client devices 104 and/or drone device 102) in order to identify characteristics of a captured workflow (e.g., areas of insufficient image data), consolidate workflows (e.g., temporally, spatially, spectrally) to generate visualizations of the received data (e.g., a consolidated workflow including a composite image generated based on received time-stamped images and respective sets of meta data; a consolidated multi-spectral workflow for a region of interest), for processing, analyzing, and extracting data (e.g., biological/non-biological feature data and/or temporal data) from generated spatial, spectral, and/or temporal representations of subject datasets (e.g., constructed maps, dense point clouds, meshes, texture-mapped meshes, etc.), and for detecting temporal observable changes and/or conditions (e.g., potential conditions, health conditions, etc.); and
- dissemination module 218 for sending data (e.g., identified characteristics, consolidated workflows, etc.) for viewing and/or further processing.

The subject data store 214 (and any other data storage modules) stores data associated with one or more subjects in one or more types of databases, such as graph, dimensional, flat, hierarchical, network, object-oriented, relational, and/or XML databases, or other data storage constructs.

FIG. 3 is a block diagram illustrating an exemplary client device 104, in accordance with some embodiments.

The client device 104 (e.g., a computer-enabled imaging device, such as a smart phone) typically includes one or more processing units (processors or cores) 302, one or more network or other communications interfaces 304, memory 306, and one or more communication buses 308 for interconnecting these components. The communication buses 308 optionally include circuitry (sometimes called a chipset) that interconnects and controls communications between system components. The client device 104 includes a user interface 310. The user interface 310 typically includes a display device 312. In some embodiments, the client device 104 includes inputs such as a keyboard, mouse, and/or other input buttons 316. Alternatively or in addition, in some embodiments, the display device 312 includes a touch-sensitive surface 314, in which case the display device 312 is a touch-sensitive display. In client devices that have a touch-sensitive display 312, a physical keyboard is optional (e.g., a soft keyboard may be displayed when keyboard entry is needed). The user interface 310 also includes an audio output device 318, such as speakers or an audio output connection connected to speakers, earphones, or headphones. Furthermore, some client devices 104 use a microphone and voice recognition to supplement or replace the keyboard. Optionally, the client device 104 includes an audio input device 320 (e.g., a microphone) to capture audio (e.g., speech from a user). Optionally, the client device 104 includes a location detection device 322, such as a GPS (global positioning satellite) or other geo-location receiver, for determining the location of the client device 104.

The client device 104 includes an image/video capture device 324, such as a camera or webcam. In some embodiments, the image/video capture device 324 includes a two-dimensional pixelated detector/image sensor configured to capture images at one or more predefined resolutions (e.g., a low resolution, such as 480×360, and a high resolution, such as 3264×2448). In some embodiments, the image/video capture device 324 captures a workflow of images (e.g., a stream of multiple images) at a predefined frequency (e.g., 30 Hz). In some embodiments, the client device 104 includes a plurality of image/video capture devices 324 (e.g., a front facing camera and a back facing camera), where in some implementations, each of the multiple image/video capture devices 324 captures a distinct workflow for subsequent processing (e.g., capturing images at different resolutions, ranges of light, etc.). Optionally, the client device 104 includes one or more illuminators (e.g., a light emitting diode) configured to illuminate a subject or environment. In some embodiments, the one or more illuminators are configured to illuminate specific wavelengths of light (e.g., ultraviolet, infrared, polarized, fluorescence, for night time operations when there is less than a threshold level of ambient light, for example), and the image/video capture device 324 includes a two-dimensional pixelated detector/image sensor configured with respect to wavelength(s) (or alternatively represented as frequencies or frequency bands) of the light.

The image/video capture device 324 may be configured to capture images for a multi-spectral (and optionally, hyperspectral) workflow, where the images correspond to respective frequency bands (or wavelengths) of light. In some embodiments, the image/video capture device 324 includes one or more physical mechanisms for manipulating spectral characteristics of incident light (i.e., configured to selectively filter out wavelengths outside a specified frequency range of light), such as optical filters (e.g., filters configured for different frequency bands, a filter wheel, a variable/tunable filter, a composite filter, cross/linearly polarized filters, etc.) or lenses (e.g., configurable/pre-defined lenses, lenslet arrays comprising multiple sub-lenses configured for different frequency bands, etc.). In some implementations, the image/video capture device 324 includes one or more objective lenses configured with respect to an imaging sensor of the image/video capture device 324 (e.g., an objective lens positioned in front of pixel array of the imaging sensor such that incident light passes through the objective lens before detection by the imaging sensor). The physical mechanisms described above (e.g., optical filters, lenses, etc.) may be configured with respect to the one or more lenses and imaging sensor of the image/video capture device 324 in a variety of ways, such as externally (e.g., optical filter placed in front of lens and imaging sensor on the exterior of the client device 104) or internally (e.g., optical filter placed in front of lens and imaging sensor inside the client device 104; optical filter placed in between lens and imaging sensor inside the client device 104). The various mechanisms and techniques above are described in greater detail with respect to FIGS. 5A-5C.

In some embodiments, the client device 104 includes one or more sensors 326 including, but not limited to, accelerometers, gyroscopes, compasses, magnetometer, light sensors, near field communication transceivers, barometers, humidity sensors, temperature sensors, proximity sensors, lasers, range finders (e.g., laser-based), and/or other sensors/devices for sensing and measuring various environmental conditions. In some embodiments, the one or more sensors operate and obtain measurements at respective predefined frequencies.

Memory 306 includes high-speed random-access memory, such as DRAM, SRAM, DDR RAM or other random-access solid-state memory devices; and may include non-volatile memory, such as one or more magnetic disk storage devices, optical disk storage devices, flash memory devices, or other non-volatile solid-state storage devices. Memory 306 may optionally include one or more storage devices remotely located from the processor(s) 302. Memory 306, or alternately the non-volatile memory device(s) within memory 306, includes a non-transitory computer-readable storage medium. In some embodiments, memory 306 or the computer-readable storage medium of memory 306 stores the following programs, modules and data structures, or a subset or superset thereof:

- an operating system 328 that includes procedures for handling various basic system services and for performing hardware dependent tasks, and optionally doing so in accordance with one or more control signals (e.g., operating the image/video capture module 332, image/video capture device 325, sensor module 338 in accordance with control signals);
- a network communication module 330 that is used for connecting the client device 104 to other computers, systems (e.g., processing device 108), control devices, client devices 104, and/or drone device via the one or more communication network interfaces 304 (wired or wireless) and one or more communication networks (e.g., Internet, cellular telephone networks, mobile data networks, other wide area networks, local area networks, metropolitan area networks, IEEE 802.15.4, Wi-Fi, Bluetooth, etc.);
- an image/video capture module 332 (e.g., a camera module) for processing a respective image or video captured by the image/video capture device 324 (e.g., images corresponding to respective frequency bands of light), where the respective image or video may be sent or streamed (e.g., by a client application module 340) to the processing device 108;
- an audio input module 334 (e.g., a microphone module) for processing audio captured by the audio input device 320, where the respective audio may be sent or streamed (e.g., by a client application module 340) to the processing device 108;
- a location detection module 336 (e.g., a GPS, Wi-Fi, or hybrid positioning module) for determining the location of the client device 104 (e.g., using the location detection device 322) and providing this location information for use in various applications (e.g., client application module 340);
- a sensor module 338 for obtaining, processing, and transmitting meta data (e.g., device data, environmental device measurements, and/or other data associated with captured multimedia) acquired by the client device 104 and/or a respective drone device 102, including but not limited to: device identifiers (e.g., identifying the device of a group of devices that captured the multimedia item, which may include an arbitrary identifier, a MAC address, a device serial number, etc.), temporal data (e.g., date and time of a corresponding capture), location data (e.g., GPS coordinates of the location at which multimedia item was captured), multimedia capture/device settings (e.g., image resolution, focal length, frequency at which images are captured, frequency ranges that a pixelated detector is configured to detect, etc.), sensor frequencies (e.g., the respective frequency at which sensors of a device captured data, such as an accelerometer frequency, a gyroscope frequency, a barometer frequency, etc.), accelerometer readings (e.g., in meters/sec2), positional data (e.g., (x, y, z) coordinates of the device with respect to a predefined axes or point of reference; distance (sometimes referred to as an axial length) of a respective device from a region of interest or feature thereof; etc.), orientation data (e.g., roll (φ), pitch (θ), yaw (ψ)), frequency band information (e.g., respective frequency bands of light for captured images of a workflow), and/or any additional sensor or device measurements or readings for determining spatial, spectral, and/or temporal characteristics of a device, region of interest, or imaged subjects/surfaces; and one or more client application modules 340, including the following modules (or sets of instructions), or a subset or superset thereof:

a control module for receiving (e.g., from another client device 104, FIG. 1), generating (e.g., based on characteristics of a workflow), storing, providing, re-broadcasting, and/or operating components of the client device 104 in accordance with control signals;

a web browser module (e.g., Internet Explorer by Microsoft, Firefox by Mozilla, Safari by Apple, or Chrome by Google) for accessing, viewing, and interacting with web sites (e.g., a web site provided by the processing device 108), captured data (e.g., time-stamped images), and/or consolidated workflows of captured data (e.g., composite image); and/ or other optional client application modules for viewing and/or manipulating captured data or received data, such as applications for photo management, video management, a digital video player, computer-aided design (CAD), 3D viewing (e.g., virtual reality), 3D printing, holography, and/or other graphics-based applications.

Each of the above identified modules and applications correspond to a set of executable instructions for performing one or more functions as described above and/or in the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 206 and/or 306 store a subset of the modules and data structures identified above. Furthermore, memory 206 and/or 306 optionally store additional modules and data structures not described above.

Furthermore, in some implementations, the functions of any of the devices and systems described herein (e.g., client devices 104, processing device 108, etc.) are interchangeable with one another and may be performed by any other devices or systems, where the corresponding sub-modules of these functions may additionally and/or alternatively be located within and executed by any of the devices and systems. As one example, although the client device 104 (FIG. 3) includes sensors and modules for obtaining/processing images (e.g., sensors 326, an image/video capture module 332, image/video capture device 324) and obtaining respective sets of meta data (e.g., sensor module 338), in some embodiments a mobile apparatus to which the client device 104 is mounted (not illustrated) may include analogous modules, components, and device capabilities for performing the same operations (e.g., sensors and modules containing instructions for obtaining images and respective meta data). The devices and systems shown in and described with respect to FIGS. 1 through 3 are merely illustrative, and different configurations of the modules for implementing the functions described herein are possible in various implementations.

Figure 4A:
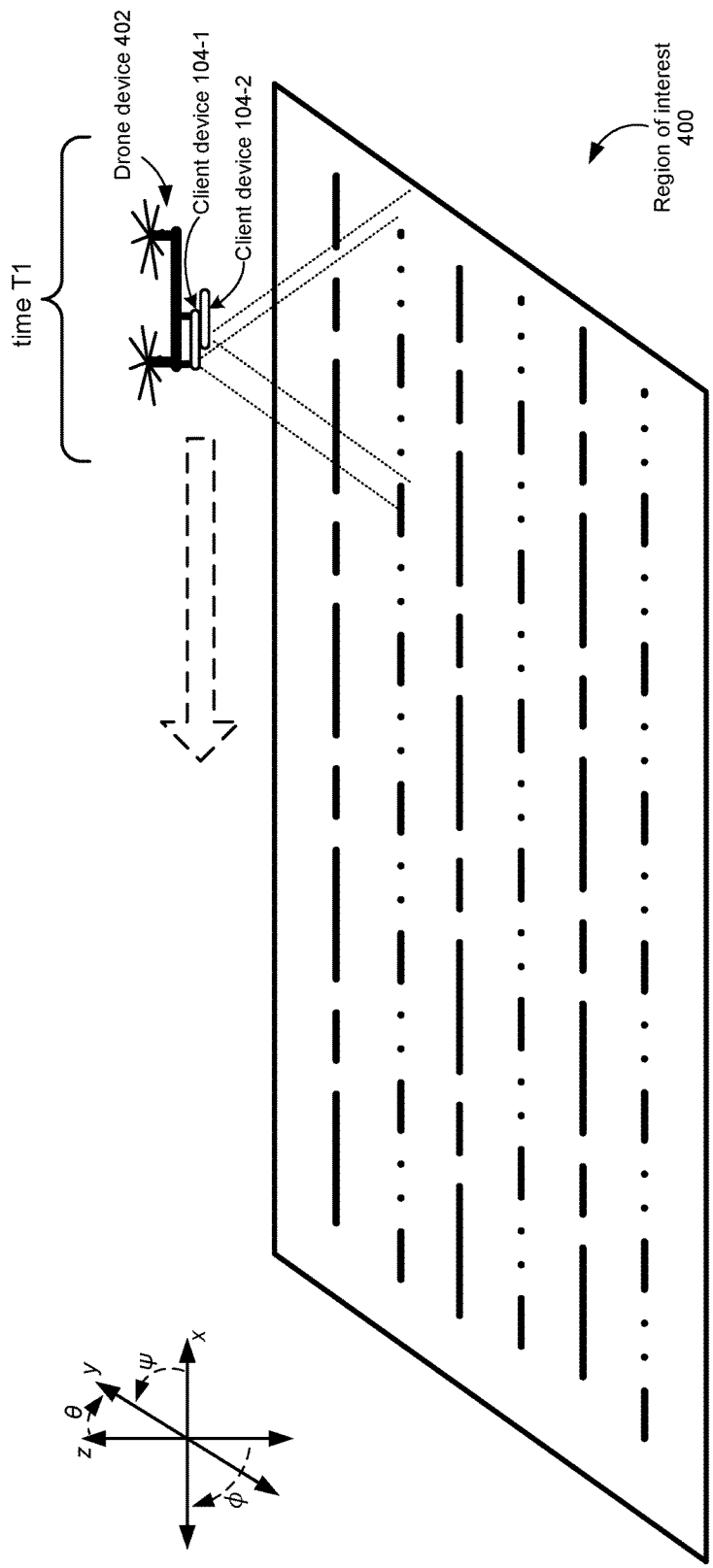
FIGS. 4A-4B illustrate an environment in which spectral image data is captured for a region of interest, in accordance with some embodiments.

FIG. 4A illustrates an environment in which spectral image data is captured for a region of interest using multiple client devices 104, in accordance with some embodiments.

The environment shown in FIG. 4A includes client devices 104-1 and 104-2, which are affixed to an airborne drone device 402 and used to obtain images of a region of interest 400 (e.g., a crop field) during a time interval T1 (e.g., a capture session). Here, camera sensors (e.g., image capture devices 324) of the client devices 104-1 and 104-2 are configured to capture spectral image data of the region of interest for different frequency bands of light (e.g., images in ultraviolet, infrared, etc.). While spectral image data is being captured, meta data is also obtained and associated with the captured images. Using the meta data, the captured images are spectrally and spatially consolidated (e.g., by processing device 108, FIG. 1), which may thereafter be used and processed for various analytical purposes.

Although in the example illustrated the client devices 104 are smart phones and the mobile apparatus is an airborne drone 402, in other implementations, the client devices 104 may be any electronic device with image capture capabilities (e.g., a camera, a PDA, etc.) and other mobile apparatuses (e.g., land vehicle) may be used (or none at all). Moreover, while multiple client devices are used in this example, other implementations may use fewer (e.g., a single client device 104 with a variable filter configured for a different frequency band during each pass; a single client device 104 that captures a workflow of images, where the workflow is virtually resampled to obtain image data for multiple specified frequency bands; etc.) or more devices and mobile apparatuses. Therefore, as described in greater detail below, the multi-spectral workflow may be obtained using any variety or combination of techniques (e.g., various filtering mechanisms, single/multiple-device configurations, processing techniques, etc.). Additionally, while the region of interest in this example is a crop field, the illustrated environment and processes described herein are also applicable to other subjects (e.g., human subjects), contexts, or regions of interest (various examples being described throughout).

In the example shown, client devices 104 are used to capture respective workflows that include one or more still-frame images, video sequences, and/or audio recordings from one or more positions and orientations, which vary as the mounted drone device 402 executes a flight pattern across the region of interest 400. Client devices 104-1 and 104-2 are configured to capture image data for different frequency bands of light (e.g., client device 104-1 obtains images corresponding to UV frequency band, while client device 104-2 obtains images corresponding to an infrared frequency band). Concurrently with image capture, client devices 1041 also acquire and associate meta data with the obtained images. Meta data may include temporal information (e.g., indication of time interval for image capture, timestamps for each captured image, etc.), spectral information (e.g., respective frequency band for captured images), and sensor readings of various environmental conditions obtained from one or more sensors of the client device 104-1 (e.g., sensors 326, such as an accelerometer, gyroscope, barometer, etc.) from which positional and orientation data for a client device can be determined (and stored as meta data). Orientations of the client devices 104 are measured with respect to a reference orientation. In this example, orientations of the client devices are defined by an angle of rotation within the x-y axis (i.e., yaw ($\psi$)), an angle of rotation within the y-z axis (i.e., pitch ($\theta$)), and an angle of rotation within the x-z axis (i.e., roll ($\varphi$)). Other types of meta data are described in greater detail throughout.

Using the associated meta data, images captured by the client devices 104 are then consolidated (e.g., by a remote processing device 108, client device 104, etc.) to form a consolidated multi-spectral workflow for further processing, analysis, or display. Images may be temporally consolidated (e.g., to identify and display an observed change of a region of interest over time), spectrally consolidated (e.g., grouping and stitching together images based on a common frequency band of light, and using positional/orientation data to associate images for one frequency band with images for another frequency band) and/or spatially consolidated (e.g., generate three-dimensional spectral images of the region of interest for different frequency bands).

Figure 4B:
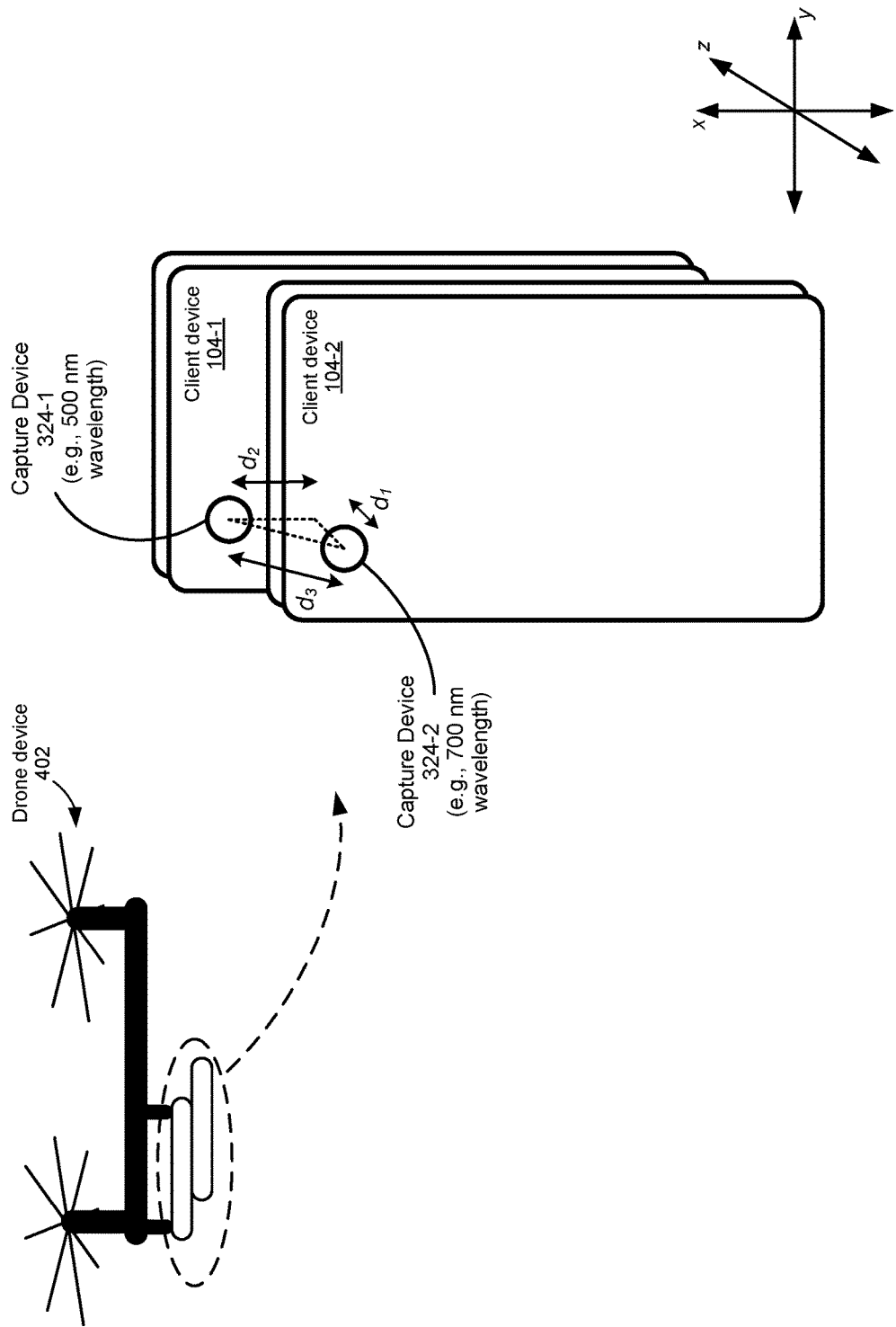

FIG. 4B illustrates a configuration of the client devices 104 in FIG. 4A. As shown, client device 104-1 and client device 104-2 are both fixedly mounted to one another, and both are mounted to drone device 402. By stacking client devices, various multi-spectral configurations can be contemplated, as each client device can be configured with respect to a given frequency band (or wavelength(s)), or set of frequency bands. Here, image capture device 324-1 (i.e., an image sensor) of client device 104-1 is configured with respect to a 500 nm wavelength, and image capture device 324-2 of client device 104-2 is configured with respect to a 700 nm wavelength. At the same time, the number of mobile apparatuses and executed flight patterns (or capture sessions) is also minimized. In this example, a single drone device 402 carries both client devices 104-1 and 104-2, thus allowing for a multi-spectral workflow to be captured in a single pass (i.e., without flying the drone device 402 over the region of interest 400 multiple times).

In stacked configurations, known distances or thicknesses between stacked devices (e.g., any one of distances $d_1$ through $d_3$) can also be used as additional mathematical values to enhance spatial consolidation and generation of visual representations (e.g., two or three-dimensional maps, dense point clouds, textured meshes, etc.) for regions of interest, or features thereof. The known distances or other derived values (e.g., angular scene differences determined using distances $d_1$ through $d_3$; difference in percentage of axial lengths of features within a region of interest) may be used alone or in combination with other associated data (e.g., associated meta data, such as positional/orientation data for the client devices 104 during image capture) to determine distances from client devices to a region of interest or features thereof (e.g., distances of client devices to facial region of human subject), and/or to determine other measurable characteristics (e.g., size, geometry, etc.) of features within the region of interest (e.g., a size of a specific crop in a crop field).

Figure 5A:
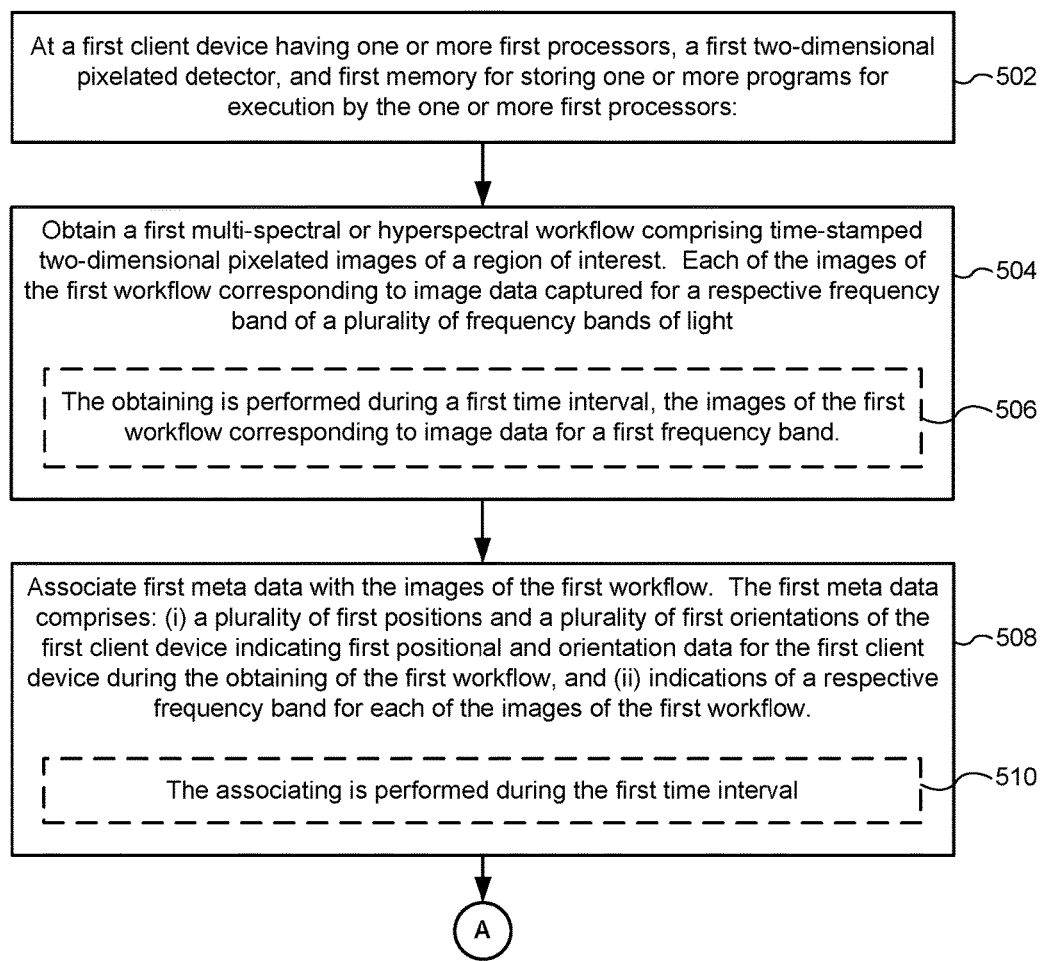
FIGS. 5A-5C are flow diagrams illustrating a method for capturing and consolidating spectral image data in order to generate a consolidated multi-spectral workflow, in accordance with some embodiments.
Figure 5B:
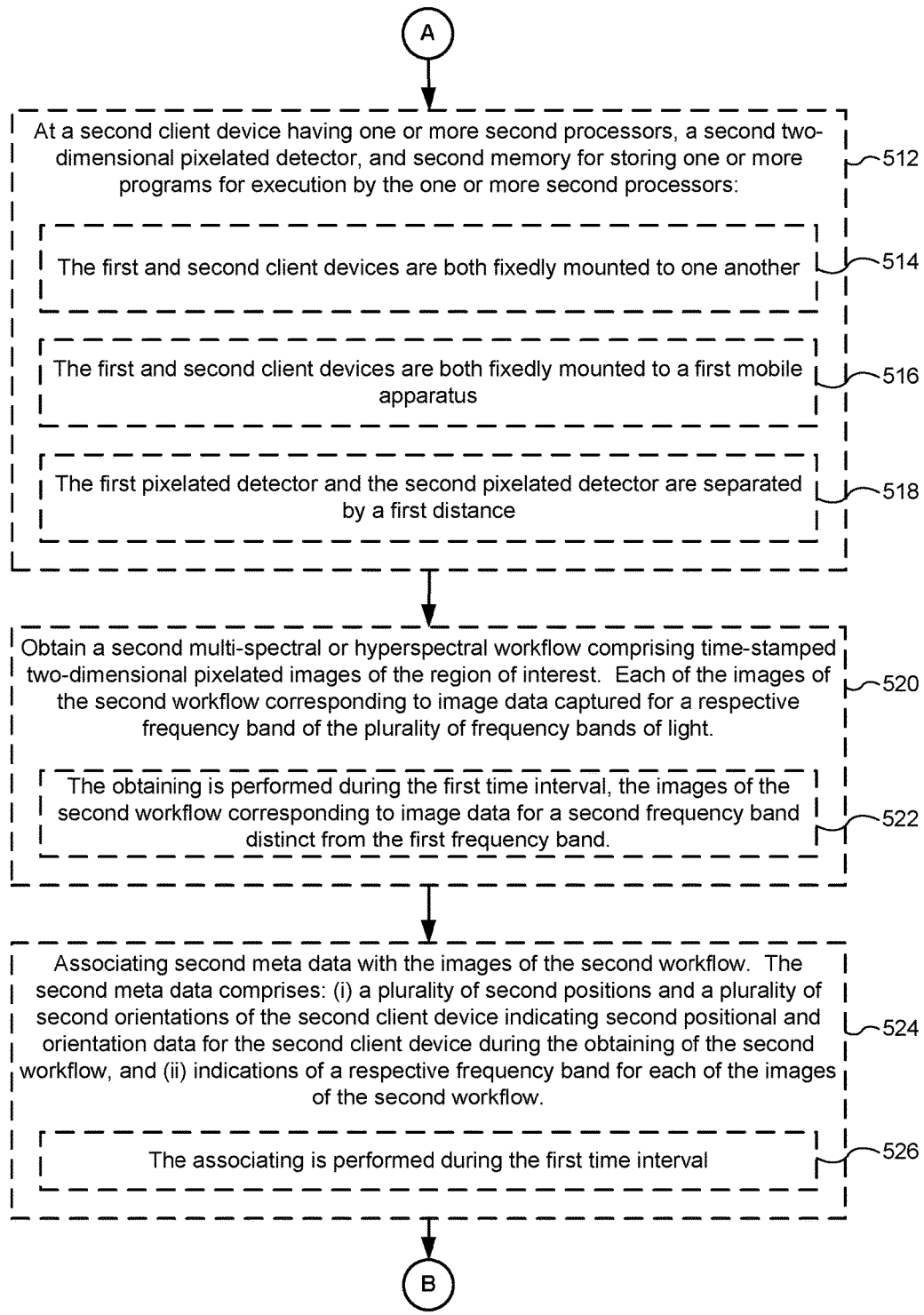
Figure 5C:
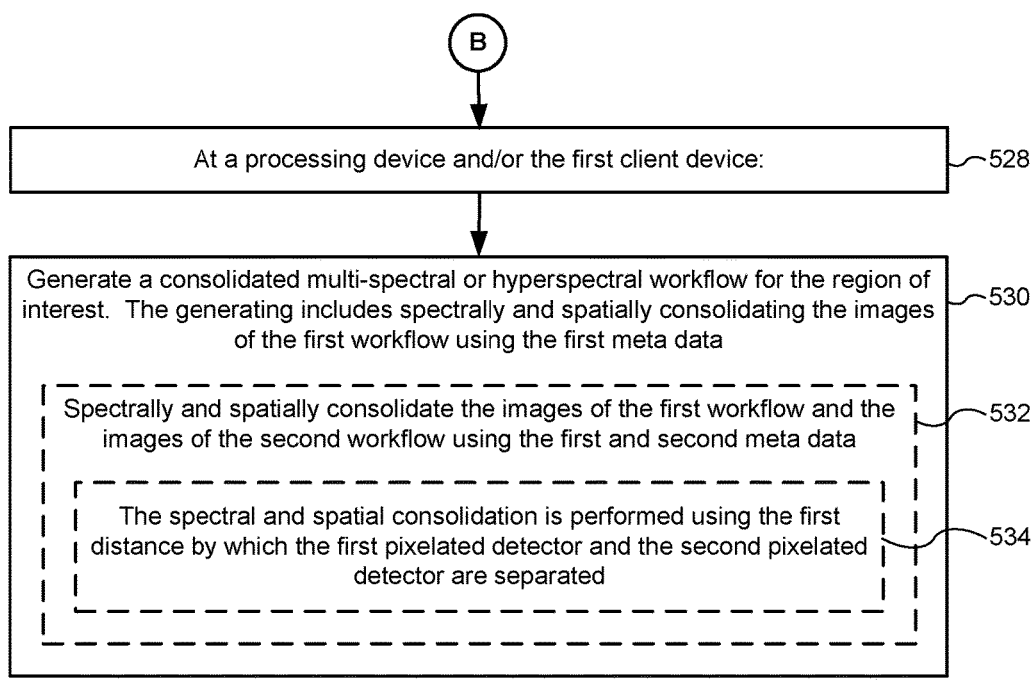

FIGS. 5A-5C are flow diagrams illustrating a method 500 for capturing and consolidating spectral image data using one or more client devices 104 in order to generate a consolidated multi-spectral or hyperspectral workflow, in accordance with some embodiments. In some implementations, the method 500 is performed by one or more devices of one or more systems (e.g., client devices 104, mobile apparatuses, processing device 108, etc. of an imaging system 100, FIGS. 1-3), or any combination thereof. Thus, in some implementations, the operations of the method 500 described herein are entirely interchangeable, and respective operations of the method 500 are performed by any one of the aforementioned devices and systems, or combination of devices and systems. For ease of reference, the methods herein will be described as being performed by a first client device (e.g., client device 104-1), a second client device (e.g., client device 104-2), and a processing device (e.g., processing device 108) of an environment (e.g., 100, FIG. 1). While parts of the methods are described with respect to a client device or a processing device, any operations or combination of operations of the method 500 may be performed by any electronic device having image capture/processing capabilities (e.g., a computer-enabled imaging device, such as a smart phone, a camera device, a computer-enabled imaging device, a PDA, etc.).

Although some steps of the method 500 are described with respect to either a first client device or a second client device, any operations performed by the second client device (e.g., steps 512 through 526, FIG. 5B) may be performed in accordance with any of the embodiments described with respect to the first client device (e.g., steps 502 through 510, FIG. 5A), and vice versa. Furthermore, any respective operations performed by the first and/or second client device may be performed additionally, alternatively, and/or concurrently (or in parallel) with one another (e.g., concurrent capture of multi-spectral or hyperspectral workflows). Moreover, any operations described with respect to the first and/or second client device may be analogously performed by one or more additional client devices of the imaging system 100 (or other devices/systems described herein, such as an additional client devices, mobile apparatuses, etc.), additionally, alternatively, and/or concurrently with the operations of the first and/or second client device. An example in which multiple client devices (e.g., client devices 104-1 and 104-2) are used for concurrent and varied multi-spectral data capture is illustrated in FIGS. 4A-4B. The method 500 may be analogously performed in accordance with any of the embodiments described with respect to the method 500 (FIGS. 5A-5F). Furthermore, any steps of the method 500 may be performed additionally, alternatively, and/or concurrently with any steps of the method 500.

Steps of the method 500 described with respect to FIG. 5A correspond to instructions/programs stored in a memory or other computer-readable storage medium of a first client device (e.g., memory 306 of client device 104-1, FIGS. 1, 3, 4, 4A-4B). The steps are performed (502, FIG. 5A) at a first client device. The first client device includes one or more processors (e.g., 302), a first two-dimensional pixelated detector (e.g., image/video capture module 332, image/video capture device 324), and memory (e.g., memory 306) for storing one or more programs for execution by the one or more processors. Furthermore, the steps of the method 500 described with respect to FIG. 5B (e.g., for implementations in which a plurality of client devices are used for spectral data capture) correspond to instructions/programs stored in a memory or other computer-readable storage medium of a second client device (e.g., memory 306 of client device 104-2, FIGS. 1, 3, 4, 4A-4B). The steps are performed (512) at the second client device distinct from the first client device. The second client device includes one or more processors (e.g., 302), a second two-dimensional pixelated detector (e.g., image/video capture module 332, image/video capture device 324), and memory (e.g., memory 306) for storing one or more programs for execution by the one or more processors. Optionally, the first and/or second client devices include one or more additional sensors (e.g., barometer, compass, light sensors, etc.) for acquiring additional sensor readings that may be used as additional mathematical variables in processing operations (e.g., for consolidating workflows).

As an overview of the method 500, a first client device (e.g., client device 104-1) obtains (504, FIG. 5A) a first multi-spectral or hyperspectral workflow comprising time-stamped two-dimensional pixelated images of a region of interest. Each of the images of the first workflow corresponding to image data captured for a respective frequency band of a plurality of frequency bands of light. First meta data is associated (508) with the images of the first workflow. The first meta data comprises: (i) a plurality of first positions and a plurality of first orientations of the first client device indicating first positional and orientation data for the first client device during the obtaining of the first workflow, and (ii) indications of a respective frequency band for each of the images of the first workflow. In implementations with a second client device, the second client device obtains (520, FIG. 5B) a second multi-spectral or hyperspectral workflow comprising time-stamped two-dimensional pixelated images of the region of interest. Each of the images of the second workflow corresponding to image data captured for a respective frequency band of the plurality of frequency bands of light. The second client device associates (524) second meta data with the images of the second workflow. The second meta data comprises: (i) a plurality of second positions and a plurality of second orientations of the second client device indicating second positional and orientation data for the second client device during the obtaining of the second workflow, and (ii) indications of a respective frequency band for each of the images of the second workflow. Subsequently and/or concurrently, the processing device, or any of the first and second client devices, generates (530, FIG. 5C) a consolidated multi-spectral or hyperspectral workflow for the region of interest, wherein generating comprises spectrally and spatially consolidating the images of the first workflow using the first meta data. An exemplary environment in which the method 500 is performed is described with respect to FIGS. 4A-4B. Various embodiments of the method 500 are described in greater detail below.

As described below, multi-spectral or hyperspectral workflows may be captured using any variety or combination of spectral boost mechanisms (e.g., physical add-ons, such as filters, lenses, etc.) or techniques. In particular, multi-spectral or hyperspectral workflows may be captured by employing positional tactics in which any configuration of one or more client devices and optional mobile apparatuses may be used (e.g., using a single client device to perform multiple spectral captures, using multiple client devices to perform multiple spectral captures in one pass, etc.). For any of these configurations, multi-spectral or hyperspectral workflows may be obtained using a combination of processing techniques (e.g., virtual resampling), and/or by employing various physical mechanisms for manipulating spectral characteristics of incident light (e.g., using and configuring various filters, lenses, etc.).

Referring now to FIG. 5A, the first client device (e.g., client device 104-1, FIG. 4A) obtains (504) a first multi-spectral or hyperspectral workflow comprising time-stamped two-dimensional pixelated images of a region of interest. Each of the images of the first workflow corresponding to image data captured for a respective frequency band of a plurality of frequency bands of light (e.g., workflow includes images captured with respect to a 700 nm wavelength and other images captured with respect to a 500 nm wavelength). First meta data is associated (508) with the images of the first workflow. The first meta data comprises: (i) a plurality of first positions and a plurality of first orientations of the first client device indicating first positional and orientation data for the first client device during the obtaining of the first workflow, and (ii) indications of a respective frequency band for each of the images of the first workflow. Other examples of meta data are described throughout (e.g., meta data managed by sensor module 338, FIG. 3).

Multi-spectral (and hyperspectral) workflows include image data for one or a plurality of frequency bands. Frequency bands for a multi-spectral or hyperspectral workflow may include any specified frequency (or wavelength) or range of frequencies of the entire electromagnetic spectrum, including frequencies within and outside of the visible spectrum. In some implementations, multi-spectral and hyperspectral are terms used synonymously and interchangeably to describe the above. In other embodiments, a hyperspectral workflow is a type of multi-spectral workflow. Here, compared to a multi-spectral workflow, a hyperspectral workflow of images may include image data for a larger number of specified frequency bands (e.g., dozens of specified frequency bands for hyperspectral versus 4 bands for multi-spectral), and for specified spectral frequency bands having narrower bandwidths (e.g., 5 nm bandwidth channel for hyperspectral versus 50 nm bandwidth channels for multi-spectral), each spectral frequency band characterized by a central wavelength and a bandwidth (e.g., corresponding to a full width at half maximum value). For example, in some embodiments, each client device (or the client devices collectively) is configured to collect a hyperspectral workflow of images, where each image in the workflow is collected at a discrete spectral frequency band, and the workflow comprises images collected at any 4 or more, any 5 or more, any 6 or more, any 7 or more, any 10 or more, or any 20 or more different spectral bands. In some embodiments, corresponding full width at half maximum values are less than 30 nm, less than 20 nm, less than 15 nm, less than 10 nm, or 5 nm or less. In some embodiments, the different spectral bands are in the visible spectrum. In some embodiments, the different spectral bands collectively span portions of the visible spectrum and portions of the ultraviolet spectrum. In some embodiments, the different spectral bands collectively span portions of the visible spectrum and portions of the infrared spectrum. In some embodiments, the different spectral bands collectively span portions of the visible spectrum, the ultraviolet spectrum, and the infrared spectrum. As described herein, any of the disclosed embodiments for obtaining a multi-spectral workflow may analogously be used for obtaining a hyperspectral workflow, and vice versa.

In some embodiments, a first plurality of images (of the multi-spectral workflow) may be obtained that correspond to a first frequency band, the first frequency band including a first subset and a second subset of frequencies. The first plurality of images includes a first subset of images corresponding to the first subset of frequencies, and a second subset of images corresponding to the second subset of frequencies. In some implementations, the first subset of frequencies (e.g., 400-550 nm) partially overlaps with the second subset of frequencies (e.g., 500-650 nm). Alternatively, the first subset of frequencies (e.g., 400-500 nm) and the second subset of frequencies do not overlap (e.g., 550-650 nm).

Rather than using filters to capture image data for specified frequency bands (as discussed in greater detail below), spectral image data may be obtained for the region of interest by virtual resampling. Here, a respective central wavelength where an image sensor (e.g., image/video capture device 324) has peak sensitivity, and a respective bandwidth (full width at half maximum value (FWHM)) of the spectral response function for the image sensor, are identified for each of the color lights (e.g., red, green, blue) (e.g., for image/video capture device 324 of the client device 104-1, peak sensitivities are determined to be near 450, 530 and 600 nm, and the FWHM value are approximately 100, 100 and 75 nm, respectively). Using the known central wavelength and FWHM values, images of a workflow obtained by the client device (e.g., RGB color images) can be resampled to match the response of a new instrument with multiple channels given its central wavelengths and bandwidths (e.g., resampling frequency bands, each of which includes a respective resampling central frequency and respective resampling bandwidth), where the resampled images correspond to image data for the workflow for one or more resampling frequency bands. A deconvolution process is applied to each pixel to generate three new spectral values of high spectral resolution (e.g. 0.5 nm FWHM). These values will then be used in convolution with the multiple channel spectral response functions to simulate virtual spectral data from the new instrument. Using this process, existing data (e.g., a workflow of RGB color images) is transformed to simulate multispectral sensor responses virtually, thereby allowing images of a workflow to be represented with respect to the one or more resampling frequency bands (e.g., multiple frequency bands of the visible spectrum).

Additionally and/or alternatively, spectral image data for the first multi-spectral or hyperspectral workflow may be obtained by employing positional tactics in which any configuration of one or more client devices and optional mobile apparatuses may be used (e.g., using a single client device to perform multiple spectral captures, using multiple client devices to perform multiple spectral captures in one pass, etc.), and/or by using various physical mechanisms (e.g., using and configuring various filters, lenses, etc.), as described below.

In some cases, a single client device (e.g., the first client device 104-1) may be used to obtain (504) the first multi-spectral workflow and associate (508) first meta data with the images of the first workflow.

For example, to capture a multi-spectral (or hyperspectral) workflow, a single client device may make multiple passes over a region of interest. Here, the same pixelated detector (e.g., the first pixelated detector) of the client device is reconfigured for each pass (e.g., adjusting a variable filter, using a different filter, etc., described in greater detail below) so that images obtained for each pass correspond to one or a set of specified frequency bands (or wavelength(s)) of light (e.g., client device 104-1 is fixed to a drone device 402, which flies over the region of interest 400 multiple times in order to capture images for different frequency bands). For example, in some implementations, obtaining (504) the first workflow includes obtaining, during a first time interval (e.g., T1), a first plurality of images of the region of interest using the first pixelated detector configured with respect to a first frequency band (e.g., 500 nm wavelength), wherein the first plurality of images corresponds to image data for the first frequency band. Furthermore, during a second time interval after the first time interval (e.g., during T2, which follows T1), a second plurality of images of the region of interest is obtained using the first pixelated detector configured with respect to a second frequency band (e.g., 700 nm wavelength) distinct from the first frequency band, wherein the second plurality of images corresponds to image data for the second frequency band.

In other embodiments, rather than making multiple passes over the region of interest, the single client device includes a plurality of pixelated detectors (e.g., a first and a second pixelated detector) and makes a single pass over the region of interest. Here, each pixelated detector is configured for a respective frequency band (e.g., a client device 104-1 with two image/video capture devices 324 configured with respect to different frequency bands is fixed to a drone device 402, and flies over the region of interest 400 a single time to capture images for different frequency bands). For example, in some implementations, the first client device further includes a second pixelated detector. Obtaining (504) the first workflow includes obtaining, during a first time interval (e.g., T1), a first plurality of images of the region of interest using the first pixelated detector configured with respect to a first frequency band (e.g., 500 nm wavelength), wherein the first plurality of images corresponds to image data for the first frequency band. Concurrent with obtaining the first plurality of images (e.g., during T1), a second plurality of images of the region of interest is obtained using the second pixelated detector configured with respect to a second frequency band (e.g., 700 nm wavelength) distinct from the first frequency band, wherein the second plurality of images corresponds to image data for the second frequency band.

As an alternative to the single client device embodiments described above, multiple client devices may be used to obtain multi-spectral workflows, each client device being configured for one or more respective frequency bands (an example is illustrated and described with respect to FIGS. 4A-4B). Various configurations using multiple client devices are described below.

Referring to FIG. 5B, in some embodiments, a second client device (e.g., client device 104-2), distinct from the first client device, obtains (520) a second multi-spectral workflow comprising time-stamped two-dimensional pixelated images of the region of interest. Each of the images of the second workflow corresponds to image data captured for a respective frequency band of the plurality of frequency bands of light. The second client device associates (524) second meta data with the images of the second workflow. The second meta data comprises: (i) a plurality of second positions and a plurality of second orientations of the second client device indicating second positional and orientation data for the second client device during the obtaining of the second workflow, and (ii) indications of a respective frequency band for each of the images of the second workflow.

In some cases, multiple passes are made over the region of interest using multiple client devices. Pixelated detectors for the plurality of client devices are respectively configured for one or a set of specified frequency bands, and images of a workflow (for respective frequency band(s)) are obtained in separate (but possibly partially overlapping in time) passes (e.g., client device 104-1 is fixed to a drone device and flies over the region of interest 400 to capture images for a first frequency band, and client device 104-2 is fixed to a different drone device and flies over the region of interest 400 at a different time to capture images for a second frequency band). For example, in some embodiments, the first client device obtains (504, FIG. 5A) the first workflow and associates (508, FIG. 5A) the first meta data during a first time interval (e.g., T1). The images of the first workflow correspond to image data for a first frequency band (e.g., 500 nm). Furthermore, the second client device obtains (520, FIG. 5B) the second workflow and associates (524, FIG. 5B) the second meta data during a second time interval after the first time interval, the images of the second workflow corresponding to image data for a second frequency band distinct from the first frequency band.

In alternative implementations, a single pass is made over the region of interest (an example is described with respect to FIGS. 4A-4B) using the first and second client devices. The pixelated detector for each of the plurality of client devices is configured for one or a set of specified frequency bands. In these cases, images of the workflows (for the respective frequency band(s)) are obtained in the same pass (e.g., client devices 104-1 and 104-2 are fixed to the same drone device, and fly over the region of interest 400 to respectively capture images for a first and a second frequency band). For example, in some implementations, the first client device obtains (506, FIG. 5A) the first workflow and associates (510, FIG. 5A) the first meta data during the first time interval (e.g., T1). The images of the first workflow correspond to image data for a first frequency band (e.g., 500 nm). Furthermore, the second client device obtains (520, FIG. 5B) the second workflow and associates (524, FIG. 5B) the second meta data during the first time interval (e.g., T1) and concurrent with obtaining the first workflow (by the first client device). The images of the second workflow correspond to image data for a second frequency band (e.g., 700 nm) distinct from the first frequency band.

In combination with any of the client device configurations described above (e.g., single/multiple client device configurations), multi-spectral or hyperspectral workflows may be obtained using various physical mechanisms (e.g., filters, lenses, etc.) for manipulating spectral characteristics of incident light.

For example, pixelated detectors of the client devices may be configured with one or more optical filters that selectively transmit incident light of specified wavelengths (e.g., narrow-band filters, band-pass filters, multi-band band-pass filters, etc.). In some embodiments, a variable filter (e.g., Acousto-optic tunable filters (AOTF), Liquid crystal tunable filters (LCTFs), etc.) may be used, where the filter is reconfigured for each desired frequency band (e.g., for each pass, for each client device, etc.). For example, in some implementations, the first pixelated detector (e.g., the first and/or second pixelated detectors) includes a variable spectral filter that is configured with respect to the first frequency band during the first time interval (e.g., T1), and configured with respect to the second frequency band during the second time interval (e.g., T2, which follows T1).

Alternatively, a client device may be configured to use a different optical filter for each desired frequency band. For example, in some implementations, the first pixelated detector includes a first filter that is configured with respect to the first frequency band during the first time interval, and the first pixelated detector includes a second filter that is configured with respect to the second frequency band during the second time interval. In some implementations, the first pixelated detector includes a broadband filter configured with respect to a first frequency band, and the second pixelated detector (or the first pixelated detector during a separate pass) includes a narrowband filter configured with respect to a second frequency band, the first frequency band corresponding to a larger range of frequencies than the second frequency band.

In some embodiments, pixelated detectors include (or are configured with) a filter wheel that includes a plurality of filters for different frequency bands. The filter wheel may be rotated (or otherwise adjusted) such that a different filter (or part of the filter wheel) covers the pixelated detector, where the filter wheel is rotated after each image capture, after each pass (e.g., over a region of interest), or in accordance with a predefined duty cycle (e.g., every 0.25 seconds). For example, in some implementations, the first pixelated detector (of the first client device) includes a filter wheel that is configured with respect to the first frequency band during the first time interval (e.g., during a first pass, T1), and configured with respect to the second frequency band during the second time interval (e.g., rotating prior to a second pass, T2).

In some embodiments, pixelated detectors include (or are configured with) a composite filter. A composite filter is a filter-based optical component (e.g., single filter, a filter assembly, etc.) that filters light with respect to plurality of frequency bands, wherein each of a plurality of subsets of the first pixelated detector are configured to obtain, for a respective portion of the region of interest based on a position of the first imaging device, image data for the first workflow corresponding to a respective one of the plurality of frequency bands. As an example, a composite filter may be placed in front (externally) of a pixelated detector. The composite filter may include multiple subparts (e.g., one or more), where each subpart filters light with respect a different frequency band (e.g., one subpart filters light with respect to one frequency band, and another subpart filters light with respect to a different frequency band). Accordingly, a corresponding subset of the pixelated detector (i.e., a group of pixels in an array of pixels for an image sensor over which a subpart of the composite filter passes through a specified frequency band of light) obtains image data for a corresponding frequency band. In order to obtain spectral image data for a complete region of interest, the position of the client device is adjusted (e.g., moved, rotated, shifted, etc.) such that each portion of the region of interest is captured for each specified frequency band. Thus, obtaining the first workflow includes continually adjusting the position of the first imaging device and obtaining image data at each adjusted position until each subset of the first pixelated detector obtains image data for the entire region of interest. Subsets of the pixelated detector may be any grouping of pixels (or imaging elements) of the pixelated detector (e.g., rows/lines/columns of an image sensor, a predefined shape or clustering of pixels having quantifiable dimensions, etc.) (e.g., a first subset including lines 1, 3, and 5 of the pixelated detector, and a second subset including lines 2, 4, and 6 of the pixelated detector). Once image data for all (or a subset of) portions of the region of interest are captured, consolidating the images of the first workflow includes, for each of the plurality of frequency bands, spatially and spectrally consolidating images for a respective frequency band using the first meta data (e.g., reconstruction process for stitching together corresponding images for a specified frequency).

In some embodiments, pixelated detectors include (or are configured with) a lenslet array unit. A lenslet array unit includes an array of sub-lenses, each of which is configured to filter light with respect to a respective one of a plurality of frequency bands. Each of a plurality of subsets of the first pixelated detector (i.e., a group of pixels in an array of pixels for an image sensor) correspond to a respective one of the plurality of frequency bands. The lenslet array unit and a pixelated detector are configured such that the subsets of the pixelated detector concurrently obtain (e.g., in a single snapshot) images of the same region of interest for a workflow for the respective frequency bands. For each of the plurality of frequency bands, images for a respective frequency band are spatially and spectrally consolidated using associated meta data (e.g., reconstruction process for stitching together corresponding images for a specified frequency).

Filters coupled to pixelated detectors may also be non-polarized, cross-polarized, or linearly-polarized (i.e., pixelated detectors may be configured to detect non-polarized, cross-polarized, and/or linearly-polarized light). For example, in some embodiments, the first pixelated detector (e.g., capture device 324-1 of client device 104-1, FIG. 4B) is configured to detect linearly-polarized light and the second pixelated detector (e.g., capture device 324-2 of client device 104-2, FIG. 4B) is configured to detect cross-polarized light. The first multi-spectral workflow obtained with the first pixelated detector (linearly-polarized) may be used to create spatial maps for surface features of the region of interest, while the second multi-spectral workflow obtained with the second pixelated detector (cross-polarized) may be used to create spatial maps for subsurface features of the region of interest.

As described previously, any of the physical mechanisms above (e.g., filters, lenses, etc.) may be configured with respect to components of a client device (e.g., imaging sensor, lens, etc. of the pixelated detector) either externally (e.g., optical filter placed in front of lens and imaging sensor on the exterior of the client device 104) or internally (e.g., optical filter placed in front of lens and imaging sensor inside the client device 104; optical filter placed in between lens and imaging sensor inside the client device 104).

For any of the embodiments described above, any combination of one or more mobile apparatuses (e.g., airborne drone, land vehicles, etc.) may be used for facilitating the capture of multi-spectral workflows and meta data. In some embodiments, the first client device is fixedly mounted to a first mobile apparatus and the second client device is fixedly mounted to a second mobile apparatus (e.g., different mobile apparatuses). In some embodiments, the first and second mobile apparatuses are airborne during the first time interval (e.g., two airborne drones). In some embodiments, only the first mobile apparatus is airborne during the first time interval (e.g., first client device mounted to an airborne drone, second client device mounted to a land vehicle). In some embodiments, the first and second client devices are fixedly mounted to the same mobile apparatus (e.g., the same airborne drone).

In some embodiments (e.g., implementations in which a single pass is made over the region of interest using multiple client devices), the first and second imaging devices are both fixedly mounted (514) to one another. An example is shown in FIGS. 4A-4B, where client devices 104-1 and 104-2 are stacked together in such a way that their respective capture devices 324-1 and 324-2 do not obstruct each other. In some embodiments, the first and second client devices are both fixedly mounted (516) to a first mobile apparatus (e.g., drone device 402, FIGS. 4A-4B). In some implementations, the first pixelated detector and the second pixelated detector are separated (518) by a first distance (e.g., any one of distances $d_1$ through $d_3$ shown in FIG. 4B). The use of these known distances between client devices in such configurations (e.g., used to enhance spatial consolidation, generation of visual representations, etc.) is described in greater detail with respect to FIG. 5C.

Referring now to FIG. 5C, a processing device (e.g., processing device 108), the first client device (e.g., client device 104-1), and/or the second client device (e.g., client device 104-2) generate (530) a consolidated multi-spectral workflow for the region of interest. The generating includes spectrally and spatially consolidating the images of the first workflow using the first meta data. Consolidation of respective workflows captured by one or more client devices results in the generation of spatial (e.g., three-dimensional spectral images of the region of interest for different frequency bands), spectral (e.g., spectral images of the region of interest for different frequency bands), and/or temporal (e.g., changes to spectral image data for a region of interest over time) visual representations of captured data for the subject. The consolidated multi-spectral workflow may include one or a collection of images (e.g., each image corresponding to a stitched image of the region of interest for a different frequency band), or may be viewable or accessed in other media formats (e.g., video that sequentially displays images for the region of interest for different frequency bands). In some embodiments, generating (530) the consolidated multi-spectral workflow includes spectrally and spatially consolidating (532) the images of the first workflow and the images of the second workflow using the first and second meta data (e.g., implementations in which two client devices are employed, such as the example in FIGS. 4A-4B).

Spatial consolidation of images of multi-spectral (or hyperspectral) workflows may be performed to derive three-dimensional images of the region of interest for different frequency bands. In some embodiments, spatial consolidation includes matching a plurality of spatial features found in images (e.g., for a respective frequency band) of a multi-spectral/hyperspectral workflow, and estimating a parallax between the spatial features using associated positional and orientation data. Spatial features whose estimated parallaxes satisfy a parallax threshold are added as points to a constructed two or three-dimensional map. Optionally, these constructed maps are then used to create dense point clouds and/or generate textured meshes representing a captured subject or region of interest for a respective frequency band.

Spectral consolidation may include using captured meta data to associate or map images from different workflows (or from different pluralities of images) with each other, the images of the workflows corresponding to respective frequency bands. For example, in some implementations, the first multi-spectral workflow (obtained by the first client device in 504, FIG. 5A) includes a first plurality of images corresponding to image data for a first frequency band (e.g., 500 nm), and a second plurality of images corresponding to image data for a second frequency band (e.g., 700 nm) distinct from the first frequency band. Consolidating (530) the images of the first workflow includes associating images from the first plurality of images (e.g., 500 nm) with corresponding images from the second plurality of images (e.g., 700 nm), based on the first positional and orientation data of the first meta data.

In some embodiments (e.g., where multiple client devices are used to obtain multi-spectral workflows), the consolidating (530) includes associating (532) images from the first multi-spectral workflow (obtained by the first client device in 504, FIG. 5A) with corresponding images from the second multi-spectral workflow (obtained by the second client device in 520, FIG. 5B), based on the first positional and orientation data of the first meta data (508, FIG. 5A) and the second positional and orientation data of the second meta data (524, FIG. 5B).

In some embodiments, the spectral and spatial consolidation (532) is performed (534) using the first distance by which the first pixelated detector and the second pixelated detector are separated (e.g., any one of distances $d_1$ through $d_3$ shown in FIG. 4B). As mentioned previously, in configurations in which multiple client devices are used together (e.g., stacked with one another), known distances or thicknesses between stacked devices can be used as additional mathematical values to enhance processes for: spatial consolidation (implementations described with respect to FIG. 5F), generation of visual representations (e.g., two or three-dimensional maps, dense point clouds, textured meshes, etc.), and/or derivation of other distance or size-related characteristics for regions of interest (e.g., distances of client devices to facial region of human subject, size of a specific crop in a crop field), or features thereof.

For example, in some embodiments, the first distance (e.g., any one of distances $d_1$ through $d_3$ shown in FIG. 4B) is used to spatially consolidate the images of the first and second workflows in order to derive a three-dimensional image of the region of interest (e.g., known distances between the client devices 104-1 and 104-2 are used in conjunction with positional/orientation meta data to better estimate a parallax of corresponding images in different workflows and add points to a map when a parallax threshold is satisfied). In some embodiments, the first distance is used (sometimes in conjunction with other associated meta data) to derive sizes for features within the region of interest.

Other measurements or values derived from the known distances (e.g., angular scene differences determined using distances $d_1$ through $d_3$; difference in percentage of axial lengths of features within a region of interest; etc.) may also be used to enhance or otherwise improve the accuracy of generating, processing or analyzing the consolidated multi-spectral workflow.

In some embodiments, a consolidated image (e.g., one image, a collection of images, video, etc.) from the consolidated multi-spectral workflow is displayed at the processing device (or other device). In some implementations, displaying the consolidated image comprises displaying a portion of the consolidated multi-spectral workflow, the portion including images corresponding to a selected frequency band of interest (e.g., image(s) of the region of interest, for one or more respective frequency bands).

For situations in which the systems discussed above collect information about users, the users may be provided with an opportunity to opt in/out of programs or features that may collect personal information (e.g., information about a user's preferences or a user's contributions to social content providers). In addition, in some embodiments, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

One aspect of the present disclosure provides a method for capturing multispectral and hyperspectral data for a region of interest using one or more spectral boost mechanisms or techniques. The method comprises at a first computer-enabled imaging device comprising one or more first processors, a first two-dimensional pixelated detector, and first memory for storing one or more programs for execution by the one or more first processors obtaining a first multi-spectral or hyperspectral workflow comprising a first plurality of images of the region of interest, each respective image of the first plurality of images corresponding to image data captured for a corresponding frequency band of a plurality of frequency bands of light, wherein each respective image in the first plurality of images is a time-stamped two-dimensional pixelated image. The method continues by associating first meta data with respective images of the first plurality of images, wherein the first meta data comprises: (i) a plurality of first positions and a plurality of first orientations of the first imaging device indicating first positional and orientation data for the first imaging device during the obtaining of the first workflow, and (ii) indications of a respective frequency band for each respective image in the first plurality of images. Then, at a central system and/or the first imaging device a consolidated multi-spectral or hyper-spectral workflow for the region of interest is generated by spectrally and spatially consolidating the first plurality of images using the first meta data. In some such embodiments, the first computer-enabled imaging device further comprises an LED spectral lighting system for generating each frequency band of the plurality of frequency bands. In some such embodiments, the LED spectral lighting system clips onto a casing of the first computer-enabled imaging device, the LED spectral lighting system is integrated into a full unibody smartphone casing of the first computer-enabled imaging device, the LED spectral lighting system is a ring system over a lens of the first computer-enabled imaging device, and/or the LED spectral lighting system is fully integrated into the casing of the first computer-enabled imaging device. For disclosure on such lighting embodiments, see U.S. Patent Application No. 62/027,404, entitled "Hyperspectral Transmitter," filed Jan. 10, 2017, which is hereby incorporated by reference.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method for capturing multispectral and hyperspectral data for a region of interest using one or more spectral boost mechanisms or techniques, the method comprising:

at a first computer-enabled imaging device comprising one or more first processors, a first two-dimensional pixelated detector, and first memory for storing one or more programs for execution by the one or more first processors:

obtaining a first multi-spectral or hyperspectral workflow comprising a first plurality of images of the region of interest, each respective image of the first plurality of images corresponding to image data captured for a corresponding frequency band of a plurality of frequency bands of light, wherein each respective image in the first plurality of images is a time-stamped two-dimensional pixelated image;

associating first meta data with respective images of the first plurality of images, wherein the first meta data comprises: (i) a plurality of first positions and a plurality of first orientations of the first imaging device indicating first positional and orientation data for the first imaging device during the obtaining of the first workflow, and (ii) indications of a respective frequency band for each respective image in the first plurality of images;

at a central system and/or the first imaging device:

generating a consolidated multi-spectral or hyperspectral workflow for the region of interest by spectrally and spatially consolidating the first plurality of images using the first meta data.

2. The method of claim 1, wherein respective images of the first plurality of images correspond to image data for a first frequency band, the method further comprising:

identifying a set of one or more central frequencies at which the first pixelated detector of the first imaging device has peak sensitivity;

identifying a set of one or more bandwidths of a spectral response function for the first pixelated detector;

identifying one or more resampling frequency bands, each of which includes a respective resampling central frequency and respective resampling bandwidth; and using the identified set of one or more central frequencies and the identified set of one or more bandwidths, virtually resampling the first plurality of images, wherein the resampled images correspond to image data for the first workflow for the one or more resampling frequency bands.

3. The method of claim 1, wherein the first computer-enabled imaging device further includes a second pixelated detector, and the obtaining the first workflow comprises:

during a first time interval:

obtaining a first subset of the first plurality of images using the first pixelated detector configured with respect to a first frequency band, wherein the first subset of images corresponds to image data for the first frequency band; and concurrent with obtaining the first subset of the first plurality of images, obtaining a second subset of the first plurality of images using the second pixelated detector configured with respect to a second frequency band distinct from the first frequency band, wherein the second subset of images corresponds to image data for the second frequency band.

4. The method of claim 1, wherein obtaining the first workflow comprises:

during a first time interval:

obtaining a first subset of the first plurality of images using the first pixelated detector configured with respect to a first frequency band, wherein the first subset of images corresponds to image data for the first frequency band; and during a second time interval after the first time interval:

obtaining a second subset of the first plurality of images using the first pixelated detector configured with respect to a second frequency band distinct from the first frequency band, wherein the second subset of images corresponds to image data for the second frequency band.

5. The method of claim 4, wherein the first pixelated detector is configured with a first filter that is configured with respect to the first frequency band during the first time interval, and the first pixelated detector is configured with a second filter that is configured with respect to the second frequency band during the second time interval.

6. The method of claim 4, wherein the first pixelated detector is configured with a variable spectral filter that is configured with respect to the first frequency band during the first time interval, and configured with respect to the second frequency band during the second time interval.

7. The method of claim 4, wherein the first pixelated detector is configured with a filter wheel that is configured with respect to the first frequency band during the first time interval, and configured with respect to the second frequency band during the second time interval.

8. The method of claim 1, wherein:

the first pixelated detector is configured with a composite filter that filters light with respect to the plurality of frequency bands, wherein each of a plurality of subsets of the first pixelated detector are configured to obtain, for a respective portion of the region of interest based on a position of the first imaging device, image data for the first workflow corresponding to a respective one of the plurality of frequency bands, obtaining the first workflow comprises continually adjusting the position of the first imaging device and obtaining image data at each adjusted position until each subset of the first pixelated detector obtains image data for the entire region of interest, and consolidating the images of the first workflow comprises, for each of the plurality of frequency bands, spatially and spectrally consolidating images for a respective frequency band using the first meta data.

9. The method of claim 1, wherein the first pixelated detector is configured with a lenslet array unit comprising an array of sub-lenses, each of which is configured to filter light with respect to a respective one of the plurality of frequency bands, each of a plurality of subsets of the first pixelated detector correspond to a respective one of the plurality of frequency bands, the lenslet array unit and the first pixelated detector are configured such that the subsets of the first pixelated detector concurrently obtain images of the same region of interest for the first workflow for the respective frequency bands, and generating a consolidated multi-spectral or hyperspectral workflow comprises, for each of the plurality of frequency bands, spatially and spectrally consolidating images for a respective frequency band using the first meta data.

10. The method of claim 1, wherein:

the first frequency band includes a first subset and a second subset of frequencies, and the first plurality of images includes a first subset of images corresponding to the first subset of frequencies, and a second subset of images corresponding to the second subset of frequencies.

11. The method of claim 10, wherein the first subset of frequencies partially overlaps with the second subset of frequencies.

12. The method of claim 10, wherein the first subset of frequencies and the second subset of frequencies do not overlap.

13. The method of claim 1, the method further comprising:

at a second computer-enabled imaging device having one or more second processors, a second two-dimensional pixelated detector, and second memory for storing one or more programs for execution by the one or more second processors:

obtaining a second multi-spectral or hyperspectral workflow comprising a second plurality of images of the region of interest, each respective image of the second plurality of images corresponding to image data captured for a respective frequency band of the plurality of frequency bands of light, wherein each respective image in the second plurality of images is a time-stamped two-dimensional pixelated images;
associating second meta data with the second plurality of images, wherein the second meta data comprises: (i) a plurality of second positions and a plurality of second orientations of the second imaging device indicating second positional and orientation data for the second imaging device during the obtaining of the second workflow, and (ii) indications of a respective frequency band for each of the images of the second workflow;
wherein generating the consolidated multi-spectral or hyperspectral workflow at the central system comprises spectrally and spatially consolidating the first plurality of images and the second plurality of images using the first and second meta data.

14. The method of claim 13, wherein:
the obtaining the first workflow and associating the first meta data are performed during a first time interval, and the first plurality of images of the first workflow correspond to image data for a first frequency band; and
the obtaining the second workflow and associating the second meta data are performed during a second time interval after the first time interval, and the images of the second plurality of images of the second workflow correspond to image data for a second frequency band distinct from the first frequency band.

15. The method of claim 13, wherein:
the obtaining the first workflow and associating the first meta data are performed during a first time interval, and the images of the first workflow correspond to image data for a first frequency band; and
the obtaining the second workflow and associating the second meta data are performed during the first time interval and concurrent with the obtaining the first workflow, and the images of the second workflow correspond to image data for a second frequency band distinct from the first frequency band.

16. The method of claim 13, wherein the first imaging device is fixedly mounted to a first mobile apparatus and the second imaging device is fixedly mounted to a second mobile apparatus.

17. The method of claim 16, wherein the first and second mobile apparatuses are airborne during the first time interval.

18. The method of claim 1, wherein the first computer-enabled imaging device further comprises an LED spectral lighting system for generating each frequency band of the plurality of frequency bands.

19. The method of claim 1, wherein
the LED spectral lighting system clips onto a casing of the first computer-enabled imaging device,
the LED spectral lighting system is integrated into a full unibody smartphone casing of the first computer-enabled imaging device,
the LED spectral lighting system is a ring system over a lens of the first computer-enabled imaging device, or
the LED spectral lighting system is fully integrated into the casing of the first computer-enabled imaging device.

20. A computer-enabled imaging device for capturing multispectral and hyperspectral data for regions of interest using one or more spectral boost mechanisms or techniques, comprising:
a processor; and
memory storing one or more programs for execution by the processor, the one or more programs including instructions for performing the method of claim 1.

21. A central system, comprising:
a processor; and
memory storing one or more programs for execution by the processor, the one or more programs including instructions for performing the method of claim 1.

22. A non-transitory computer readable storage medium, storing one or more programs for execution by one or more processors, the one or more programs including instructions for performing the method of claim 1.

* * * * *